United States Patent [19]

Bernini

[11] 4,142,733
[45] Mar. 6, 1979

[54] DRAFT SENSING APPARATUS FOR USE WITH TRACTORS

[75] Inventor: Giancarlo Bernini, Fabbrico, Italy

[73] Assignee: Massey-Ferguson Services N.V., Curacao, Netherlands Antilles

[21] Appl. No.: 840,409

[22] Filed: Oct. 7, 1977

[30] Foreign Application Priority Data

Oct. 9, 1976 [GB] United Kingdom ............... 42077/76

[51] Int. Cl.² ............................................. B60D 1/00
[52] U.S. Cl. .................................... 280/446 A; 172/7
[58] Field of Search .................... 280/446 A, 446 R; 172/7, 8, 9, 10, 239

[56] References Cited

U.S. PATENT DOCUMENTS 3,246,702  4/1966  Carlin ....................................... 172/10
3,463,511  8/1969  Murphy et al. .......................... 172/7
3,888,315  6/1975  Elfes ..................................... 280/446 A Primary Examiner—John A. Pekar
Attorney, Agent, or Firm—John C. Thompson

[57] ABSTRACT

A tractor draft load sensing apparatus in which a pair of draft links are pivotally connected to opposite end portions of a bar which extends transversely across the tractor and is supported thereon at spaced locations so that draft loads imposed on the links cause flexing of the bar. A tube is rotatably mounted on the bar and extends therealong while draft load signalling means are attached to the tube for rotation therewith. The tube is operatively associated with the tractor so that flexing of the tube, caused by the imposition of draft loads, results in rotation of the tube and hence the signalling means about the bar.

9 Claims, 6 Drawing Figures

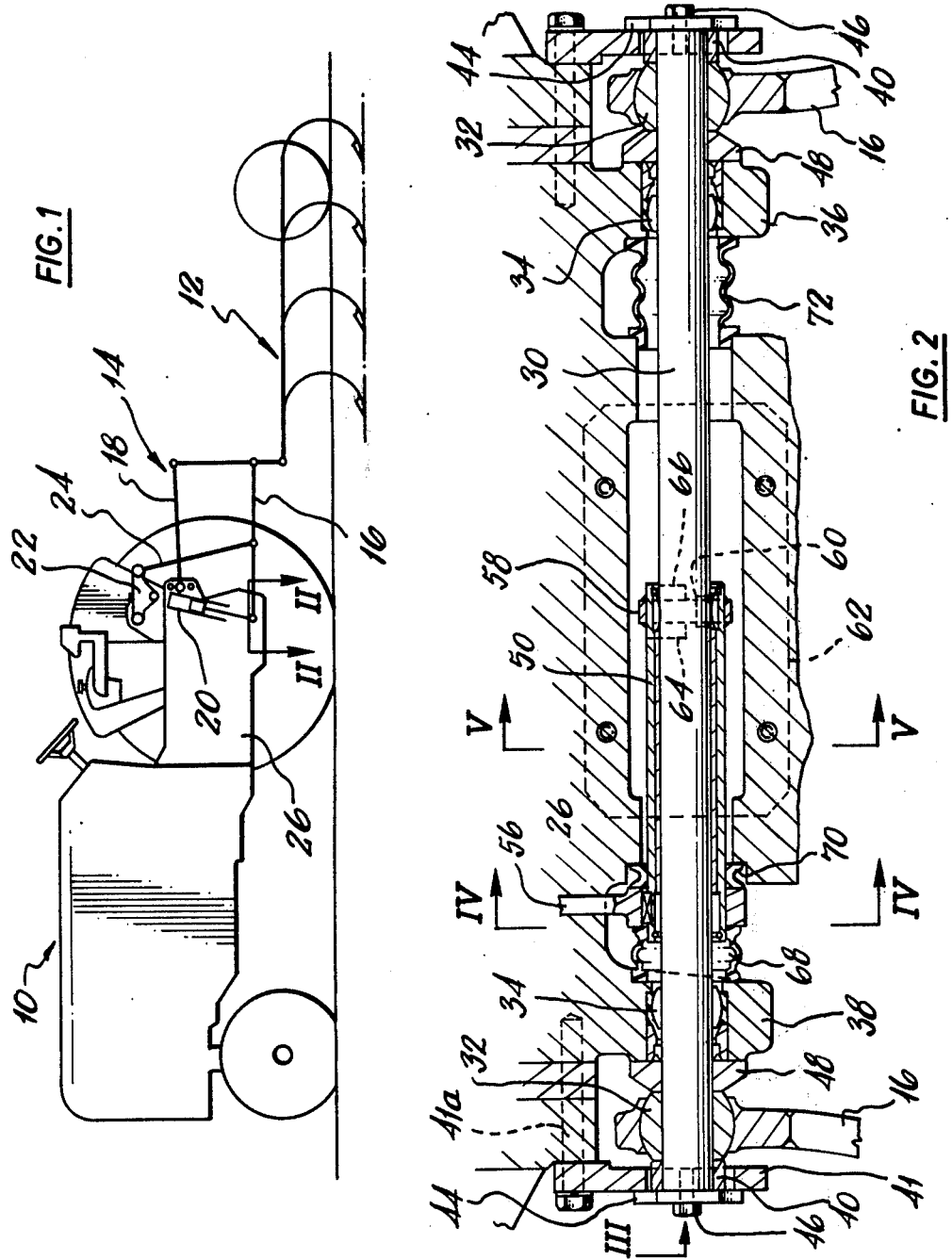

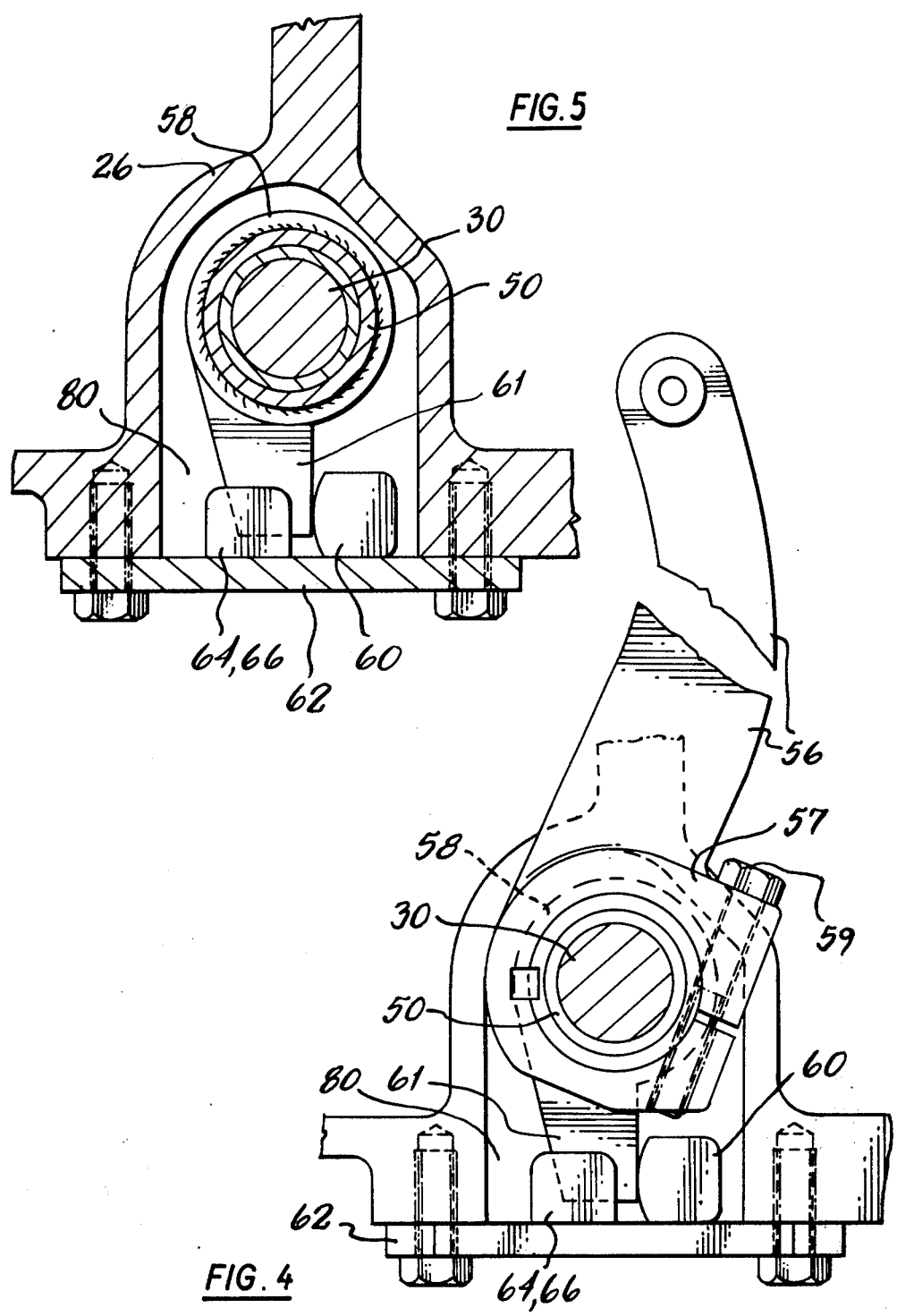

DRAFT SENSING APPARATUS FOR USE WITH TRACTORS

BACKGROUND OF INVENTION

This invention relates to tractors provided with draft load sensing apparatus.

It is well known to sense changes in the draft loads applied to tractors by implements in order to regulate their working depth. In a known draft load sensing apparatus a bar extends transversely across the tractor and draft links are attached to the ends of the bar. The bar is supported at spaced locations on the tractor so that draft loads imposed on the links cause the bar to flex. This flexure is measured, usually at the mid point of the bar, and changes in flexure are signalled to a control system which regulates the attitude of the links relative to the tractor.

In the apparatus referred to above the bar is housed within the transmission housing of the tractor with the ends extending through apertures in the housing for connection with the draft links. In such an arrangement it is difficult to seal the apertures in the transmission housing due to the translational movement of the bar so that oil escapes from the housing and/or dirt enters.

It is an object of the present invention to provide a tractor with an improved form of draft load sensing apparatus which can be used on the tractor in a manner which obviates or mitigates the above disadvantage.

SUMMARY OF INVENTION

According to the present invention we provide the combination of a tractor and a draft load sensing apparatus comprising a bar extending transversely across the tractor and supported at spaced locations thereon, a pair of draft links pivotally connected to opposite end portions of the bar so that draft loads imposed on the links cause flexing of the bar, a tube rotatably mounted on the bar and extending therealong, draft load signalling means attached to the tube and rotatable therewith, and means operatively associating the tube with the tractor so that flexing of the bar, caused by the imposition of draft loads, results in rotation of the tube and hence the signalling means about the bar.

In a preferred form of the invention the means for operatively associating the tube with the tractor includes an abutment on the tube which is arranged to be maintained in contact with a stop on the tractor during flexing of the bar.

The abutment and signalling means may be positioned on opposite end portions of the tube.

The means for operatively associating the tube with the tractor may be positioned substantially midway between the support locations.

The tube may be mounted on the bar by a pair of bushes having convex bearing surfaces, one bush being positioned adjacent the location of the means for operatively associating the tube with the tractor and the other bush being positioned adjacent the signalling means.

BRIEF DESCRIPTION OF DRAWINGS

One embodiment of the invention will now be described, by way of example only, with reference to the accompanying drawings in which:

FIG. 1 is a diagrammatic side view of a tractor and implement;

FIG. 2 is a view on the line II — II of FIG. 1;

FIG. 4 is a sectional view on the line IV — IV of FIG. 2;

FIG. 5 is a sectional view on the line V — V of FIG. 2; and

DESCRIPTION OF A PREFERRED EMBODIMENT

Figure 3:
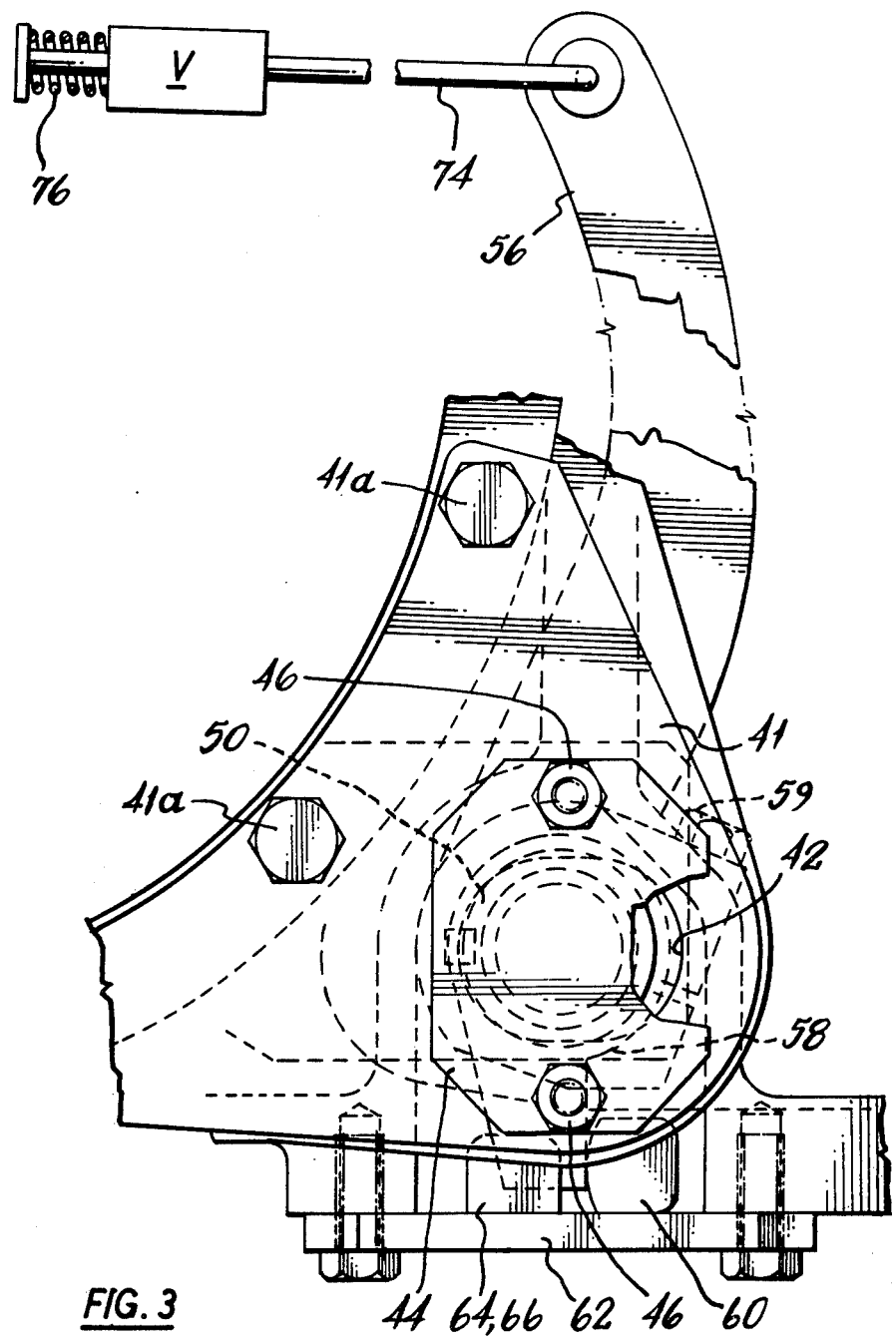
FIG. 3 is a view in the direction of arrow III of FIG. 2.

Referring now to FIG. 1, a tractor 10 is connected to an implement 12 by a three point hitch 14. The hitch comprises a pair of lower links 16 and an upper link 18, each of which is pivotally connected to the tractor 10. The lower links 16 may be raised and lowered by a lift cylinder 20 connected to the tractor 10 and operating through a rocker shaft 22 and drop links 24. The lift cylinder 20 is controlled by a control system located within the transmission housing 26 of the tractor 10. The control system, the details of which form no part of the present invention, includes a pump and a control valve which regulates flow to and from the lift cylinders 20.

Figure 6:
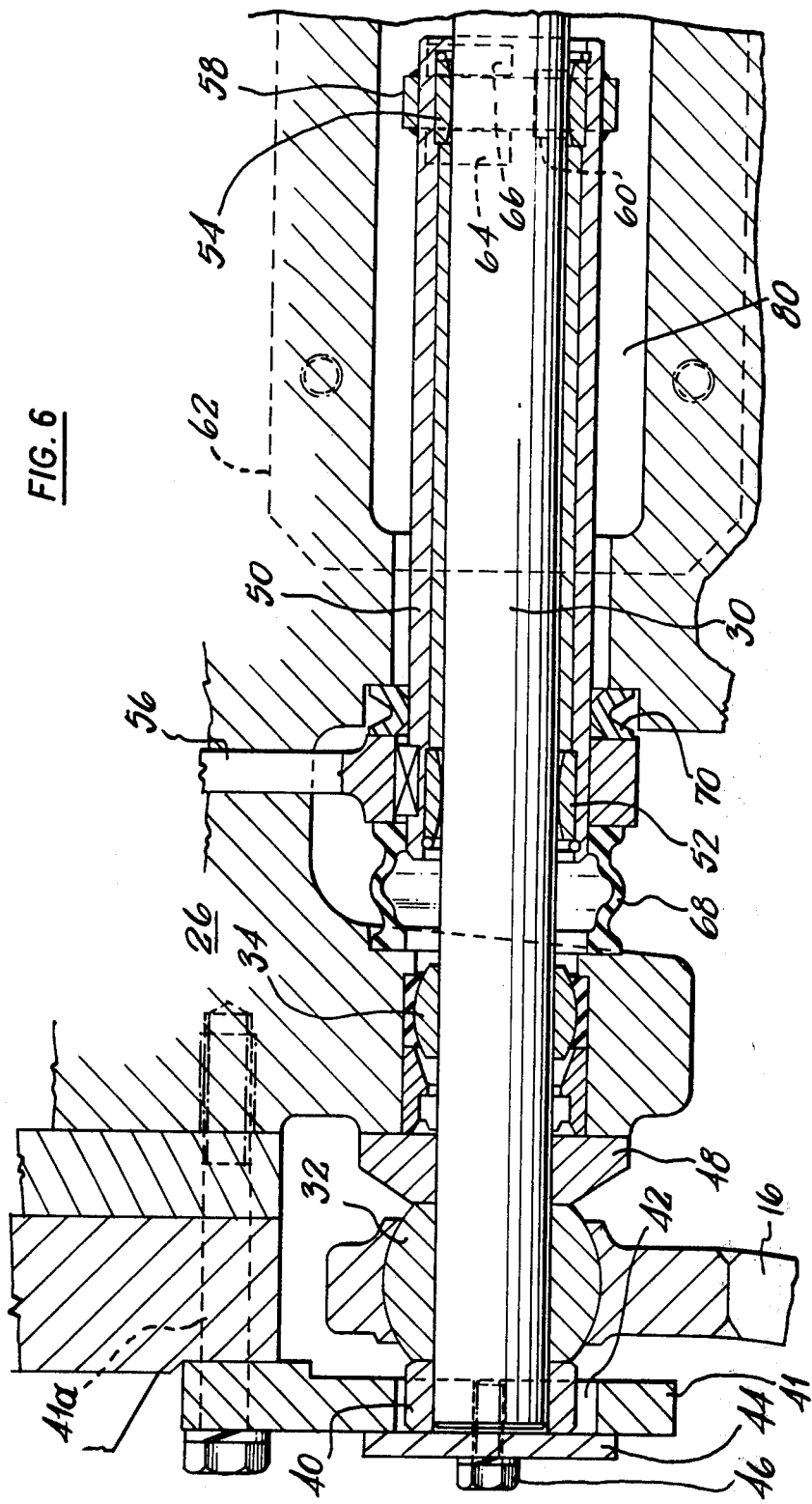
FIG. 6 is an enlarged view of one half of FIG. 2.

As can best be seen from FIGS. 2 and 6, a transverse bar 30 extends across the tractor and both end portions of the bar 30 are pivotally connected to a separate lower link 16 by a spherical bearing 32. The bar 30 is supported at spaced locations on self aligning bearings 34 mounted in extensions 36, 38 of the transmission casing 26. The central portion of the bar 30 extends through a channel 80 formed in the base of the housing 26, a base plate 62 (referred to below) being secured across the mouth of this channel.

The extremities of the bar 30 are guided by a bush 40 for longitudinal movement relative to the tractor in a substantially horizontally extending slot 42 in a plate 41 secured to the housing 26 by bolts 41a. The bush 40 is retained on the bar 30 by a fastening plate 44 secured to the plate 41 by bolts 46. A spacer 48 is placed on the bar 30 between the bearing 32 and the extensions 36, 38.

A tube 50 is mounted on the bar 30 and is supported at spaced locations by bearings 52, 54 having convex surfaces. A signalling lever 56 is keyed and clamped by a split boss 57 and bolt to one end of the tube and a flange 58 with an abutment in the form of a depending portion 61 is welded to the other end. The portion 61 abuts a stop 60 welded on the base plate 62 and the portion 61 is guided for movement relative to the housing by a pair of blocks 64, 66.

Rubber bellows 68, 70, 72 seal between the extensions 36, 38 and the housing 26 to prevent ingress of dirt. The upper end of the signalling lever 56 is connected by a mechanical linkage 74 to the valve V of the control system which is biased by a spring 76 to the left as viewed in FIG. 3.

The apparatus operates as follows:

The implement 12 imposes draft loads through the links 16 on the tractor 10. The loads are reacted by the bearings 34 causing the bar 30 to flex.

The deflection is greatest at the centre of the bar 30 causing the portion adjacent the stop 60 to translate. The bearing 54 moves with the bar 30 but the depending portion 61 of the flange 58 is held against the stop 60 by the action of the spring 76. Thus as the bar 30 flexes the tube 50 rotates on the bar 30 and the signalling lever 56 rotates with the tube 50 thus relaying signals to the valve V to regulate the attitude of the links relative to the tractor.

Vertical loads imposed on the bar 30 due to the weight of the implement cause the portion 61 to slide vertically relative to the stop 60 without causing any rotation of the tube 50. Also the bushes 40 and slots 42 ensure that the bar 30 only flexes in a substantially horizontal plane further ensuring that flexing of the bar is proportional to the draft load imposed on the links 16 and is not affected by the weight of the implement.

Thus the rotation of the tube 50 on the bar 30 is a measure of the draft load imposed on the links 16 and the signalling lever 56 relays these draft load signals to the valve V to regulate the attitude of the links 16 as described above.

It can be seen that the draft load sensing apparatus described above is compact, robust and inexpensive and lends itself to being mounted externally on the usual transmission housing of the tractor thus avoiding the sealing difficulty referred to above. In particular the compact nature of the apparatus enables the flexing of an externally mounted bar to be measured at the centre of the bar, which is an area of the tractor which is congested by other apparatus such as power take-off shafts etc., whilst the signalling lever can be located to one side of this congested area.

I claim:

1. The combination of a tractor and a draft load sensing apparatus comprising a bar extending transversly across the tractor and supported at spaced locations thereon, a pair of draft links pivotally connected to opposite end portions of the bar so that draft loads imposed on the links cause flexing of the bar, a tube rotatably mounted on the bar and extending therealong, draft load signalling means attached to the tube and rotatable therewith, and means interconnecting the tube with the tractor so that flexing of the bar, caused by the imposition of draft loads, results in rotation of the tube and hence the signalling means about the bar.

2. The combination according to claim 1 in which the means for interconnecting the tube with the tractor includes an abutment on the tube which is positioned to be maintained in contact with a stop on the tractor during flexing of the bar.

3. The combination according to claim 2 in which the abutment and signalling means are positioned on opposite end portions of the tube.

4. The combination according to claim 2 in which the stop and abutment are disposed such that vertical loads imposed on the bar due to the weight of any implement secured to the draft links cause the abutment to slide relative to the stop without causing rotation of the tube on the bar.

5. The combination according to claim 1 in which the ends of the bar are guided in horizontally elongated slots whereby the bar is caused to flex only in a substantially horizontal plane.

6. The combination according to claim 1 in which the means for interconnecting the tube with the tractor is positioned substantially midway between the support locations.

7. The combination according to claim 1 in which the tube is mounted on the bar by a pair of bushes having convex bearing surfaces, one bush being positioned adjacent the location of the means for operatively associating the tube with the tractor and the other bush being positioned adjacent the signalling means.

8. The combination according to claim 1 in which the rear of the tractor is provided with a transmission housing on which the bar is supported, part of the bar intermediate the support locations extending along a channel formed in the wall of the transmission housing.

9. The combination according to claim 8 in which the means for interconnecting the tube with the tractor includes an abutment on the tube and a stop mounted on a plate extending across the mouth of the channel, the abutment being positioned to be maintained in contact with the stop during flexing of the bar.

* * * * *